(12) United States Patent
Reynolds et al.

(10) Patent No.: US 11,300,104 B2
(45) Date of Patent: Apr. 12, 2022

(54) WIND TURBINE BLADE REMOVAL AND INSTALLATION SYSTEM AND METHOD

(71) Applicant: Barnhart Crane and Rigging Co., Memphis, TN (US)

(72) Inventors: Kevin Reynolds, Millington, TN (US); Eric Barnhart, Millington, TN (US); Thomas A. Pepin, III, Southhaven, MS (US); William Parker DePriest, Memphis, TN (US)

(73) Assignee: Barnhart Crane and Rigging Co., Memphis, TN (US)

( * ) Notice: Subject to any disclaimer, the term of this patent is extended or adjusted under 35 U.S.C. 154(b) by 274 days.

(21) Appl. No.: 15/257,201

(22) Filed: Sep. 6, 2016

(65) Prior Publication Data

US 2017/0067447 A1   Mar. 9, 2017

Related U.S. Application Data

(60) Provisional application No. 62/214,758, filed on Sep. 4, 2015.

(51) Int. Cl.
*F03D 13/10* (2016.01)
*B66C 1/10* (2006.01)

(52) U.S. Cl.
CPC .............. *F03D 13/10* (2016.05); *B66C 1/108* (2013.01); *F05B 2230/61* (2013.01); *F05B 2230/70* (2013.01); *F05B 2240/2211* (2013.01); *F05B 2240/912* (2013.01); *Y02E 10/72* (2013.01); *Y02P 70/50* (2015.11)

(58) Field of Classification Search
CPC ...... F03D 13/10; B66C 1/108; F05B 2230/70; F05B 2230/61; F05B 2240/912
See application file for complete search history.

(56) References Cited

U.S. PATENT DOCUMENTS

| | | |
|---|---|---|
| 8,083,212 B2 | 12/2011 | Numajiri |
| 8,118,552 B2 | 2/2012 | Nies |
| 8,161,693 B2 | 4/2012 | Krogh |
| 8,651,462 B2 | 2/2014 | Berio |
| 8,997,350 B2 | 4/2015 | Trade |

(Continued)

FOREIGN PATENT DOCUMENTS

| | | |
|---|---|---|
| WO | WO201195167 | 8/2011 |
| WO | WO2011110254 | 9/2011 |
| WO | WO2012167788 | 12/2012 |

*Primary Examiner* — Moshe Wilensky
(74) *Attorney, Agent, or Firm* — Baker Donelson

(57) ABSTRACT

An apparatus for removing and installing a blade for a wind turbine is provided, comprising a first set of cable guides mounted within the nacelle, and a second set of cable guides positioned on an exterior surface of the rotor hub. An upper pulley block is suspended from a first hub flange and a second hub flange, wherein the upper pulley block is positioned above a third hub flange in a position for accepting the blade. A winch is positioned at a ground level, and the winch contains a lifting cable guided by the cable guides, and then reeved through the upper pulley block and a lower pulley block on a blade holding bracket, allowing the lower pulley block to be raised and lowered relative to the upper pulley block. The blade holding bracket attaches to the root end of the blade, and the lower pulley block is allowed to pivot and swivel relative to the blade holding bracket.

7 Claims, 14 Drawing Sheets

(56) References Cited

U.S. PATENT DOCUMENTS

| | | |
|---|---|---|
| 9,027,243 B2 | 5/2015 | Neumann |
| 9,068,555 B2 | 6/2015 | Arocena De La Rua |
| 9,115,693 B2 | 8/2015 | Fenger |
| 2010/0139062 A1 | 6/2010 | Reed |
| 2011/0042632 A1* | 2/2011 | Van Berlo ............... F03D 13/10 254/264 |
| 2013/0318789 A1 | 12/2013 | Gabeiras |
| 2014/0010658 A1 | 1/2014 | Nielsen |
| 2014/0109407 A1 | 4/2014 | Neumann |
| 2014/0360015 A1 | 12/2014 | Lohan |
| 2016/0010622 A1 | 1/2016 | Modrego Jimenez |
| 2016/0040649 A1 | 2/2016 | Smith |
| 2016/0069321 A1 | 3/2016 | Neumann |
| 2016/0311666 A1* | 10/2016 | Anderson ................ B66D 1/36 |

* cited by examiner

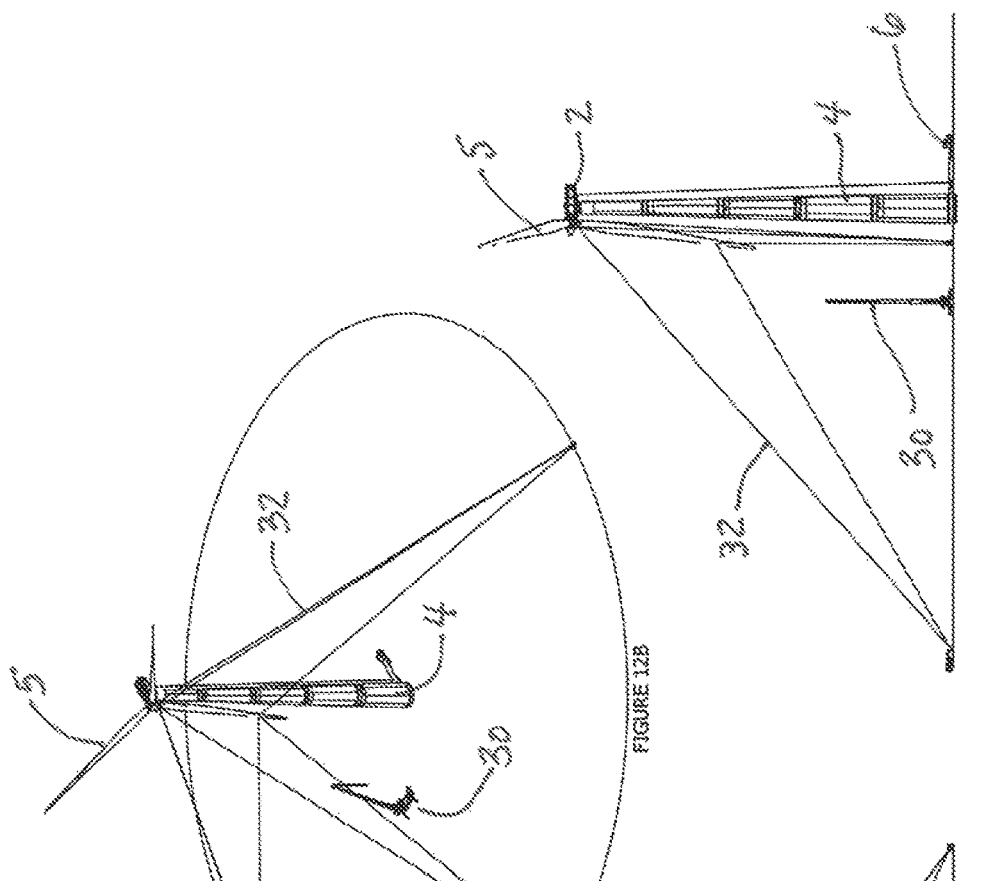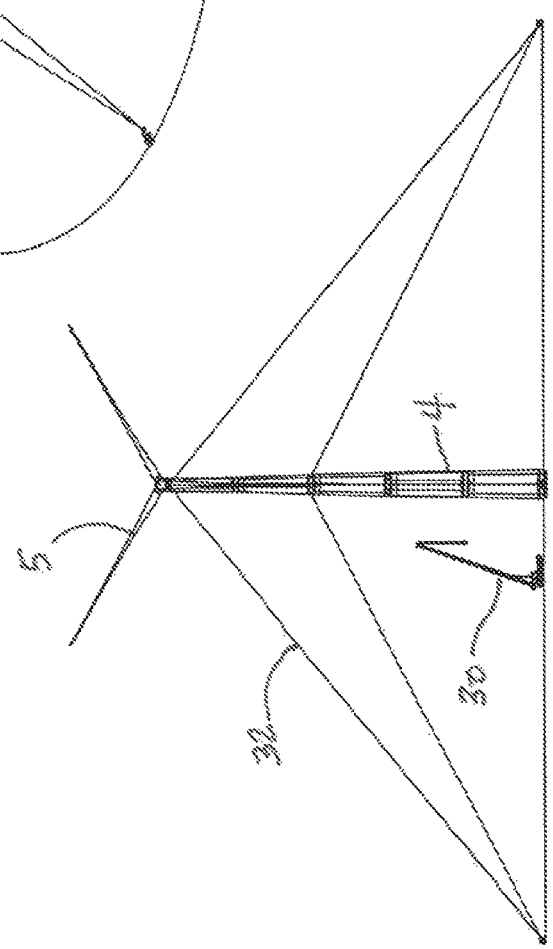

WIND TURBINE BLADE REMOVAL AND INSTALLATION SYSTEM AND METHOD

CROSS-REFERENCE TO RELATED APPLICATIONS

This nonprovisional application claims priority under 35 U.S.C. § 119 to U.S. Ser. No. 62/214,758, filed on Sep. 4, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

The invention relates generally to devices and methods to remove and install blades used on wind turbines, and more particularly to those devices and methods which facilitate the repair and maintenance of wind turbine blades without the necessity of using a crane to support the blade tip.

2. Description of Related Art

The average wind turbine size is now approximately 1.5 MW to 3.0 MW with rotor diameters ranging from 70 m to 125 m. This class of turbines has on average a nacelle weight of 50 tons (generators, gear box and nacelle housing) and a rotor weight of approximately 75 tons. To improve the economics of wind turbines, manufactures have been designing taller towers to take advantage of greater wind energy at higher levels above ground. Manufacturers are increasingly relying on 80 m to 120 m tower designs, rather than the shorter towers used previously. The cost of lowering and lifting rotor blades to the top of tall land-based towers for servicing can be prohibitive, mainly due to the reach of conventional cranes, which require much higher crane capacity than the actual weight being lifted. This is due to the bending moment resulting from the reach of conventional cranes. Currently, repairs to wind turbines require that a crane or special apparatus to be brought to the wind turbine site for holding the end of the blade while the base (or root) of the blade is removed from the rotor hub. Once detached, a lift cable routed through the nacelle and hub is employed to lower the blade so that repairs or maintenance, such as bearing replacement and other tasks, can be performed. In many cases, there is no need to completely lower the blade to the ground, because repairs can sometimes be performed simply by lowering the blade away from the hub enough to allow the necessary access. The use of cranes in such activities adds considerable expense to the repair costs, resulting in increases in the costs to provide wind-generated electricity to consumers. Understandably, if the blade can be lowered and re-attached without the use of a crane, significant savings would be realized.

Therefore, there is a need for a system and method for lowering and a re-attaching a blade for a wind turbine that does not require the use of a crane. In the absence of a crane, the weight of the blade would be entirely supported by the lifting cable, necessitating a design that is: (1) capable of safely handling the increased weight, (2) well integrated into the existing nacelle and hub structures, and (3) simple to operate for managing repairs or maintenance required on the wind turbine.

SUMMARY OF THE INVENTION

In a wind turbine having a rotor hub with a plurality of hub flanges and a nacelle mounted on a tower, an apparatus for removing and installing a blade for the wind turbine is provided, comprising in a preferred embodiment a first set of cable guides mounted within the nacelle; a second set of cable guides positioned on an exterior surface of the rotor hub; an upper pulley block suspended from a first hub flange and a second hub flange, wherein the upper pulley block is positioned above a third hub flange; a winch positioned at a ground level; a blade holding bracket adapted for matable engagement with a blade, wherein the blade holding bracket includes a lower pulley block, and wherein the lower pulley block pivots and swivels relative to the blade holding bracket; and a lifting cable routed from the winch, guided by the first and second set of cable guides, and reeved through the upper pulley block and the lower pulley block, such that the lower pulley block can be raised and lowered relative to the upper pulley block.

In a more preferred embodiment, the upper pulley block is attached to and suspended from the first hub flange and the second hub flange by a plurality of turnbuckles, and wherein each of the turnbuckles is adjustable to establish a predetermined position of the upper pulley block relative to the third hub flange.

In another embodiment, each of the turnbuckles includes identifying indicia corresponding to an attachment location.

In another embodiment, the blade has a blade flange defining a blade flange plane, and wherein the lower pulley block resides adjacent to the blade flange plane.

In a further embodiment, the blade holding bracket includes a plurality of positioning members matable with the blade, wherein each positioning member includes identifying indicia corresponding to an attachment location.

Preferably, the lower pulley block pivots relative to a central member of the blade holding bracket, wherein the central member includes an axis substantially in alignment with a center of gravity of the blade when the blade holding attachment is mounted to the blade.

Further preferably, the first set of cable guides includes a first cable roller positioned above a lower nacelle port, and a second cable roller positioned proximate to a front nacelle port. Similarly, the second set of cable guides includes a plurality of cable rollers, wherein one of the cable rollers is positioned above a front hub port.

Likewise, a method for installing a blade for a wind turbine is provided, the method comprising providing a first set of cable guides mounted within the nacelle; providing a second set of cable guides positioned on an exterior surface of the rotor hub; providing an upper pulley block suspended from a first hub flange and a second hub flange, wherein the upper pulley block is positioned above a third hub flange oriented in a downward direction; providing a winch positioned at a ground level; placing a blade holding bracket within a blade, wherein the blade holding bracket includes a lower pulley block, and wherein the lower pulley block pivots and swivels relative to the blade holding bracket; routing a lifting cable from the winch, over the first and second set of cable guides, and reeved through the upper pulley block and the lower pulley block, such that the lower pulley block can be raised and lowered relative to the upper pulley block; raising the blade; and attaching the blade to the third hub flange.

In a preferred embodiment, the upper pulley block is attached to and suspended from the first hub flange and the second hub flange by a plurality of turnbuckles, and the method further includes the step of adjusting one or more of the turnbuckles to establish a predetermined position of the upper pulley block relative to the third hub flange.

Further preferably, the upper pulley block is attached to and suspended from the first hub flange and the second hub flange by a plurality of turnbuckles, wherein each of the turnbuckles includes identifying indicia corresponding to an attachment location, and the method further includes the step of installing the turnbuckles to the attachment locations corresponding to the identifying indicia.

In another embodiment, the method may include the step of providing a crane to support a tail of the blade when the blade is being lowered to the ground level, and using the crane to maneuver the tail as the blade is lowered to a horizontal position.

In a similar embodiment, the method may include the step of providing a crane to support a tail of the blade when the blade is being raised from the ground level, and using the crane to maneuver the tail as the blade is raised to an installation position.

Further, the method may include the step of providing tag lines from the ground level to predetermined locations on the blade to manipulate the blade for removal or installation.

Finally, the invention further includes, in a preferred embodiment, a kit of parts for removing and installing a blade for a wind turbine, wherein the wind turbine has a rotor hub with a plurality of hub flanges and a nacelle mounted on a tower, comprising a first set of cable guides mountable within the nacelle; a second set of cable guides mountable on an exterior surface of the rotor hub; an upper pulley block adapted for suspension from a first hub flange and a second hub flange by a plurality of adjustable turnbuckles; a blade holding bracket adapted for matable engagement with a blade, wherein the blade holding bracket includes a lower pulley block, and wherein the lower pulley block pivots and swivels relative to the blade holding bracket; and a lifting cable adapted for routing from a winch, guiding by the first and second set of cable guides, and reeving through the upper pulley block and the lower pulley block, such that the lower pulley block can be raised and lowered relative to the upper pulley block.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIGS. 12A-12C illustrate a representative tag line layout for assisting in the manipulation of a blade during a raising or lowering operation.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The technology disclosed relates to a craneless blade removal and installation system and method of use of a wind turbine which enables a cost effective and easy attaching and lowering of a rotor blade. The wind turbine comprises a tower resting on a base, at least one rotor blade having a blade connector portion, and a nacelle housing a shaft to which a rotor hub is attached, the nacelle being mounted atop the tower. The hub comprises a plurality of hub connection flanges, and each of the hub connection flanges is adapted to be detachably connected to a blade connector portion of a rotor blade.

Blade Raising and Lowering Apparatus

Figure 1:
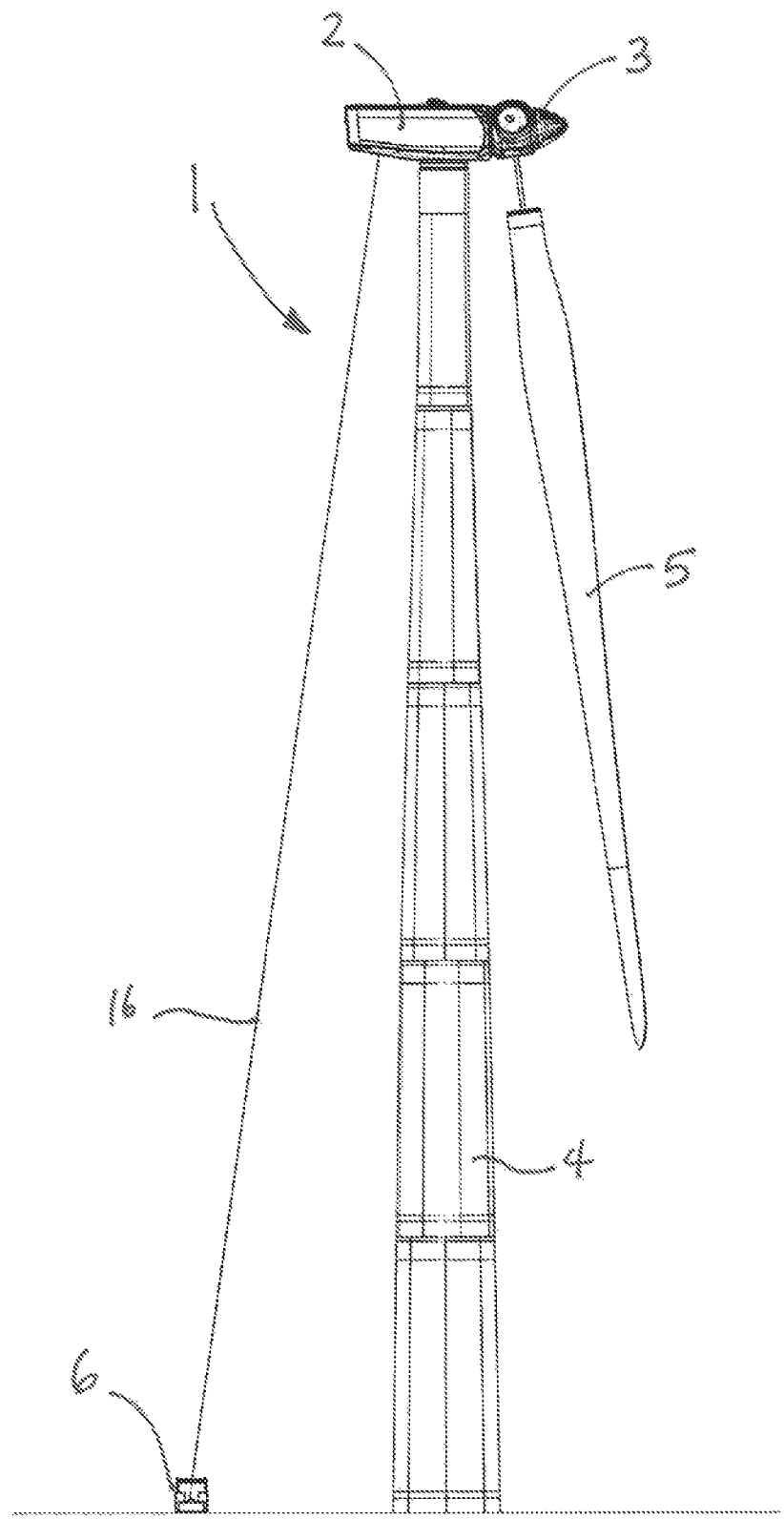
FIG. 1 illustrates a side view of a typical wind turbine in which a blade is lowered from the hub by a lift cable using a preferred embodiment of the present invention.
Figure 11:
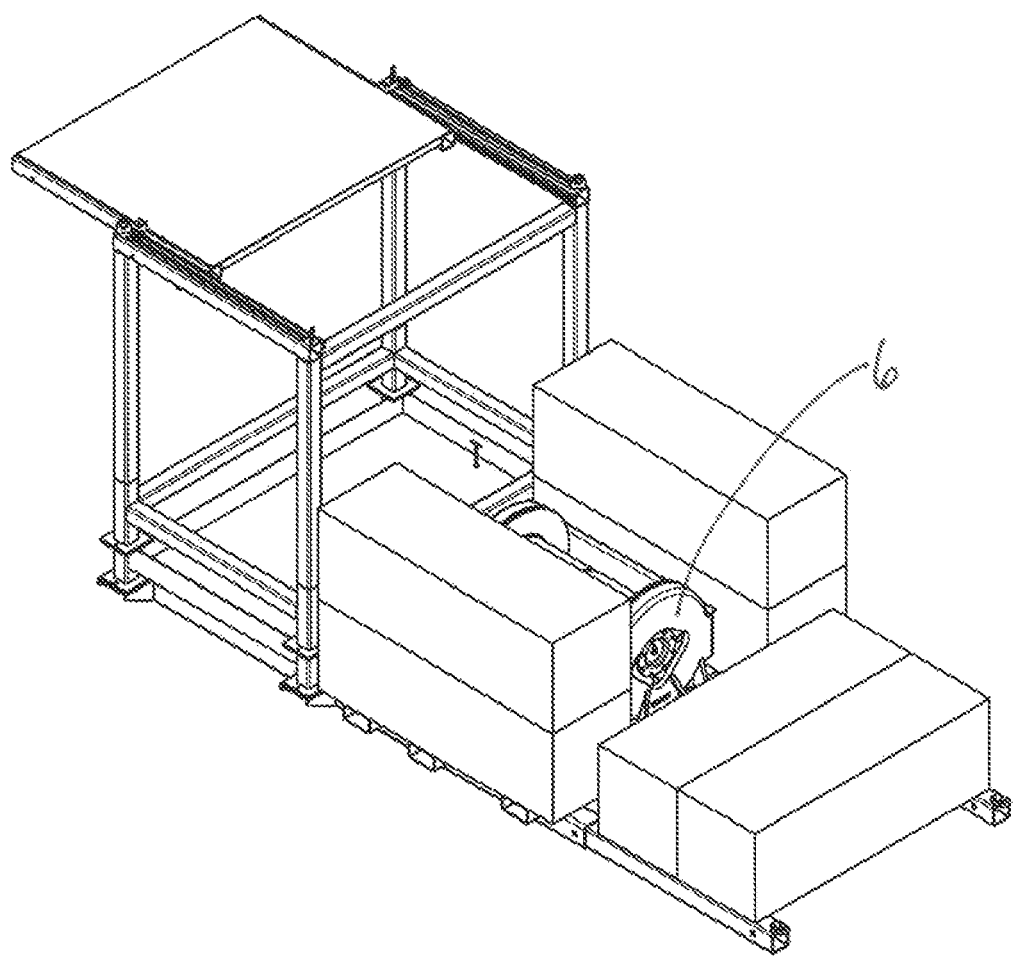
FIG. 11 illustrates a skid-mounted winch used for controlling the lifting cable.

Referring now to FIG. 1, a wind turbine 1 is shown to generally comprise a nacelle 3 and rotor hub 3 mounted for horizontal rotation above a tower 5, where the rotor hub 3 typically includes three blades 5. The nacelle 2 houses the shaft extending from the rotor hub 3, which mechanically communicates with gear works and a generator as is understood in the industry. In this view, a ground level winch 6, also shown in FIG. 11, is either skid mounted or truck mounted, and provides a lifting cable 16 which is routed through the nacelle 2 and hub 3 to move the blade 5 as will be further described herein.

Figure 2:
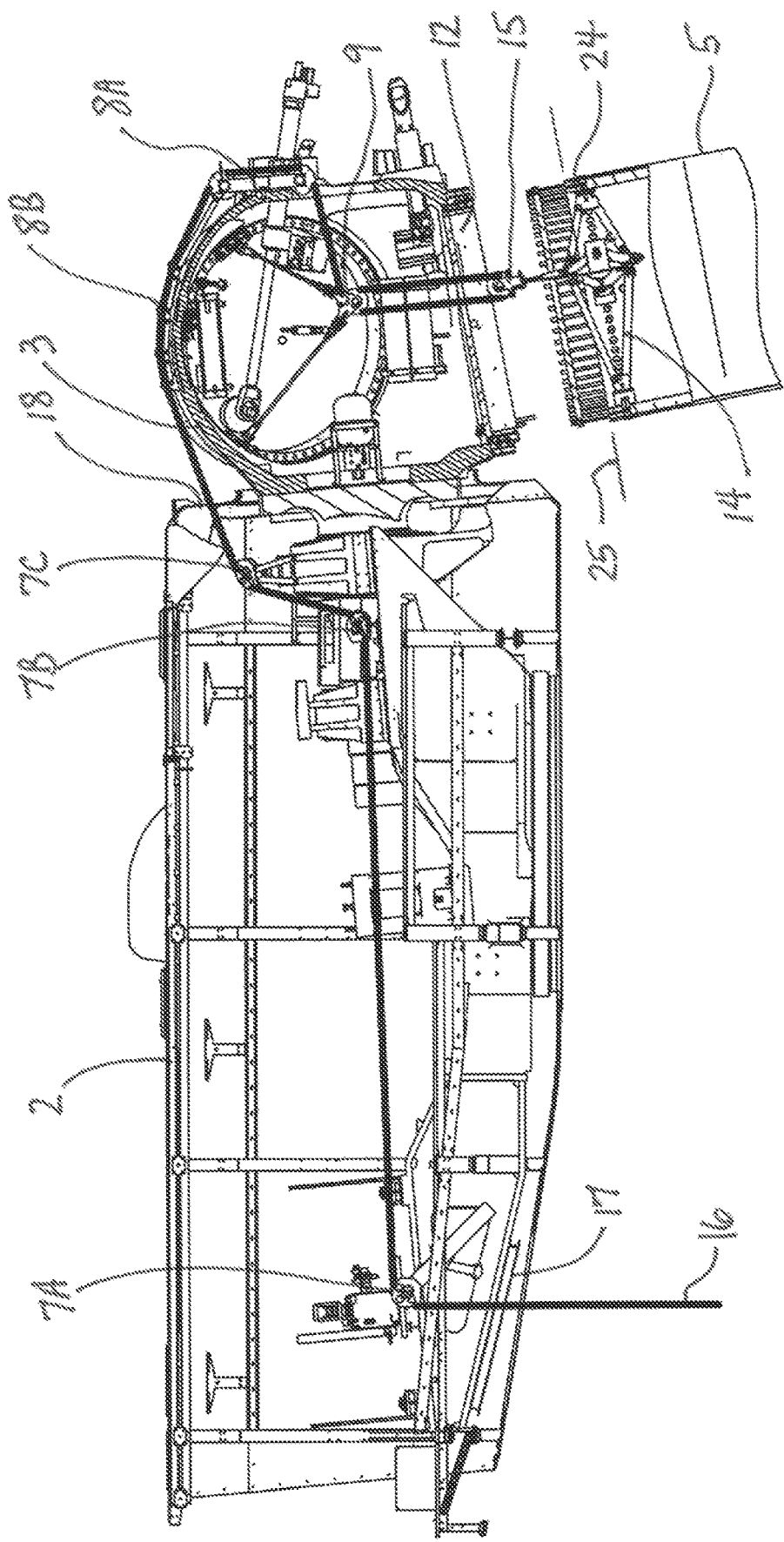
FIG. 2 illustrates a more detailed view of the wind turbine nacelle and hub, with a blade detached and lowered for maintenance or repair of equipment inside the hub.
Figure 9:
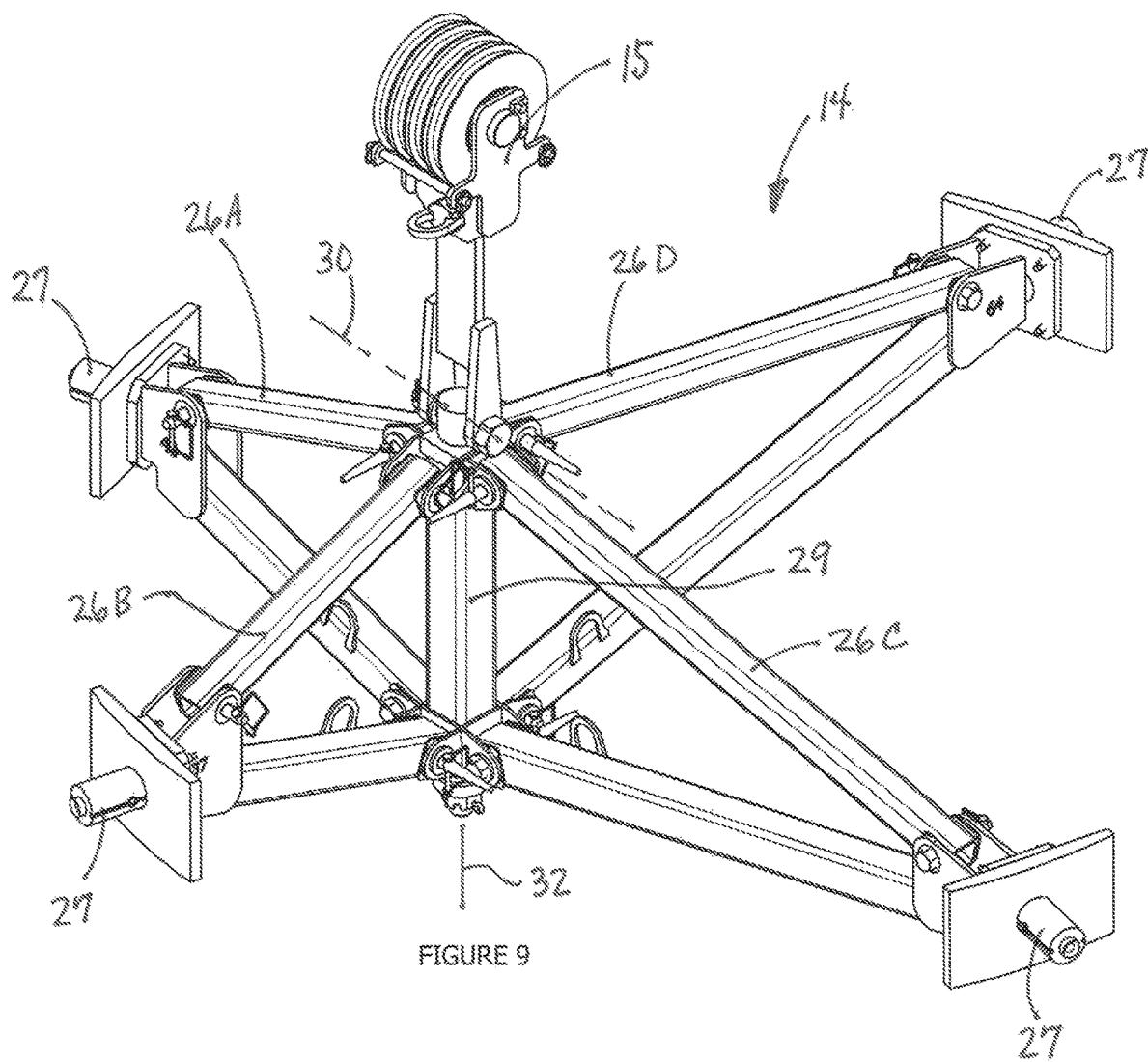
FIG. 9 illustrates a detailed perspective view of the blade holding bracket.
Figure 10:
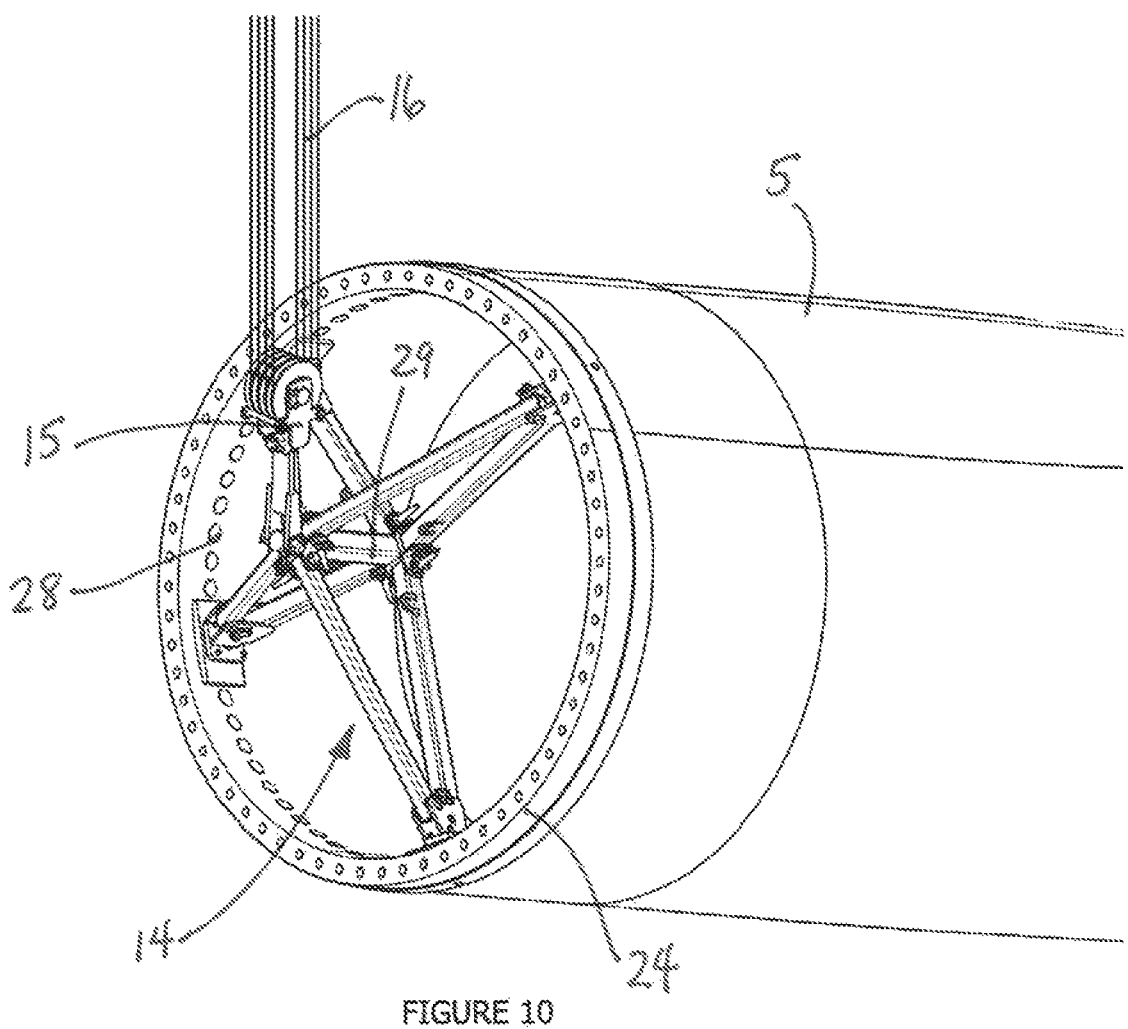
FIG. 10 illustrates the blade holding bracket mounted within the blade root as the blade is held by the lifting cable.

FIG. 2 illustrates a more detailed cross-sectional view of the wind turbine nacelle 2 and hub 3, with a blade 5 detached and lowered for maintenance or repair of a pitch bearing or other equipment inside the hub 3. Various mechanical components common to wind turbines have been removed for clarity as the novel elements of the present invention are generally described in this overall view. As shown best in FIGS. 3 and 4A-4D, a first set of cable guides 7 is mounted within the nacelle, and a second set of cable guides 8 is positioned on an exterior surface of the rotor hub 3. As shown best in FIGS. 5 and 6A-6C, an upper pulley block 9 is suspended from a first hub flange 10 and a second hub flange 11, which enables the upper pulley block 9 to be positioned above a third hub flange 12 that is oriented in the 6 o'clock position. As best shown in FIGS. 9 and 10, a blade holding bracket 14 is adapted for matable engagement with a blade 5, wherein the blade holding bracket 14 includes a lower pulley block 15. The lower pulley block 15 pivots and swivels relative to the blade holding bracket 14. Generally, the lifting cable 16 is routed from the winch 6, guided by the first and second set of cable guides 7, 8, and reeved through the upper pulley block 9 and the lower pulley block 15, such that the lower pulley block 15 can be raised and lowered relative to the upper pulley block 9, thus positioning the blade 5 as needed.

Figure 3:
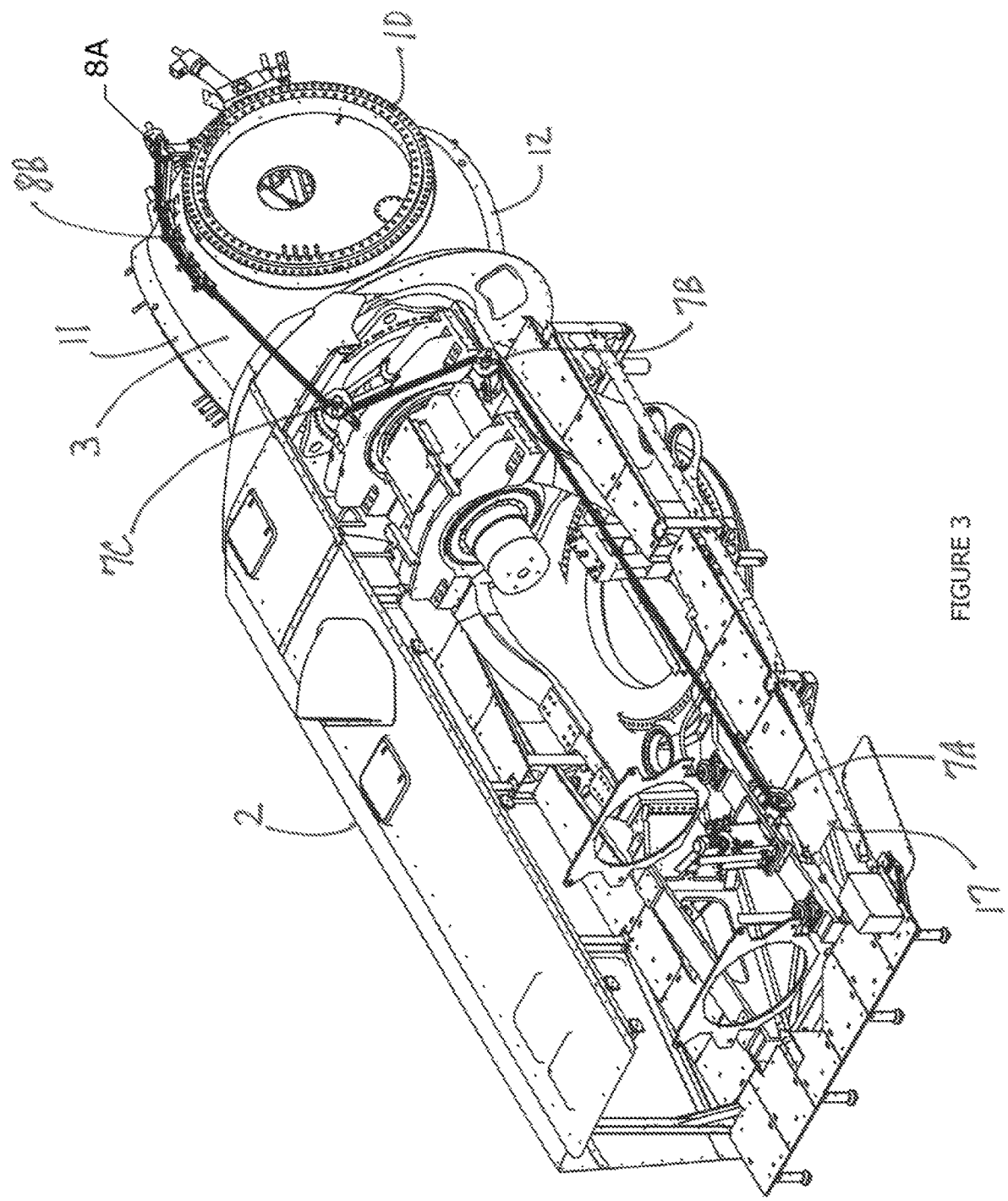
FIG. 3 illustrates a partial view of the nacelle and hub, showing the position of cable rollers and the routing of the lift cable through the nacelle and hub.
Figure 4A:
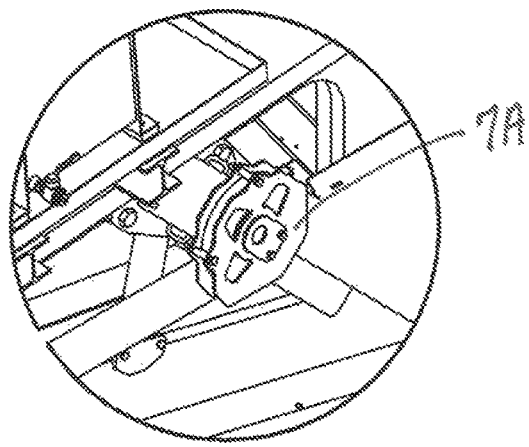
FIGS. 4A-4D illustrate details of cable rollers positioned within the nacelle and on the hub for routing of the lift cable.
Figure 4B:
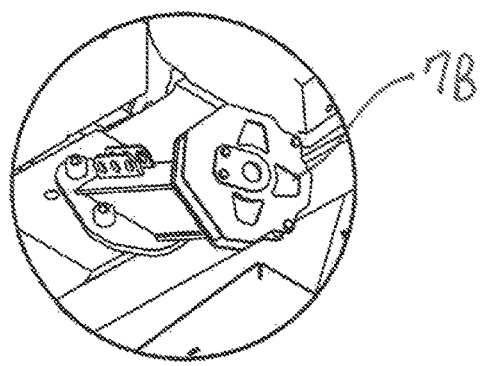
Figure 4C:
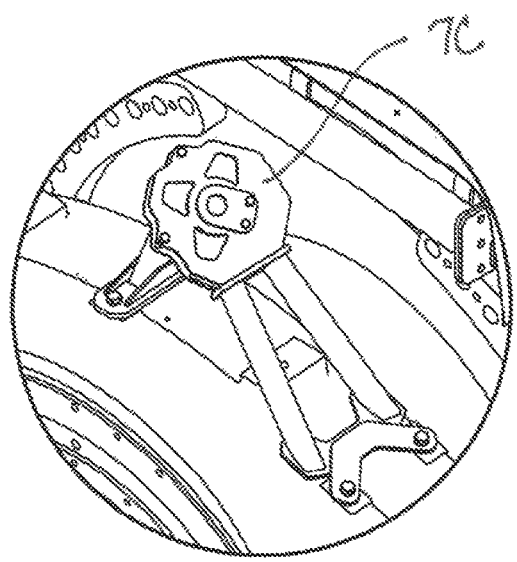

As shown in more detail in FIGS. 3, 4A, and 4C, the first set of cable guides 7 includes a first cable roller 7A positioned above a lower nacelle port 17, and at least a second cable roller 7B positioned proximate to a front nacelle port 18. In the specific embodiment shown, an additional cable roller 7C is shown in FIG. 4B and employed to properly route the lifting cable 16 around other structural elements within the nacelle 2. Depending on the specific configuration encountered with different nacelle environments, further cable rollers may be required to route the lifting cable 16. All of the cable rollers 7A-7C are bolted into suitably strong webbing or other surfaces within the nacelle 2, but are mounted with the intention of removing them upon completion of the repair or maintenance work.

Figure 4D:
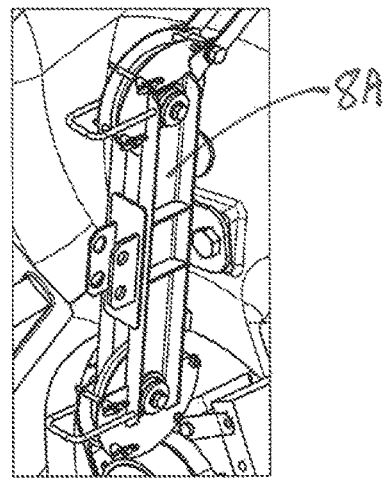
Figure 7:
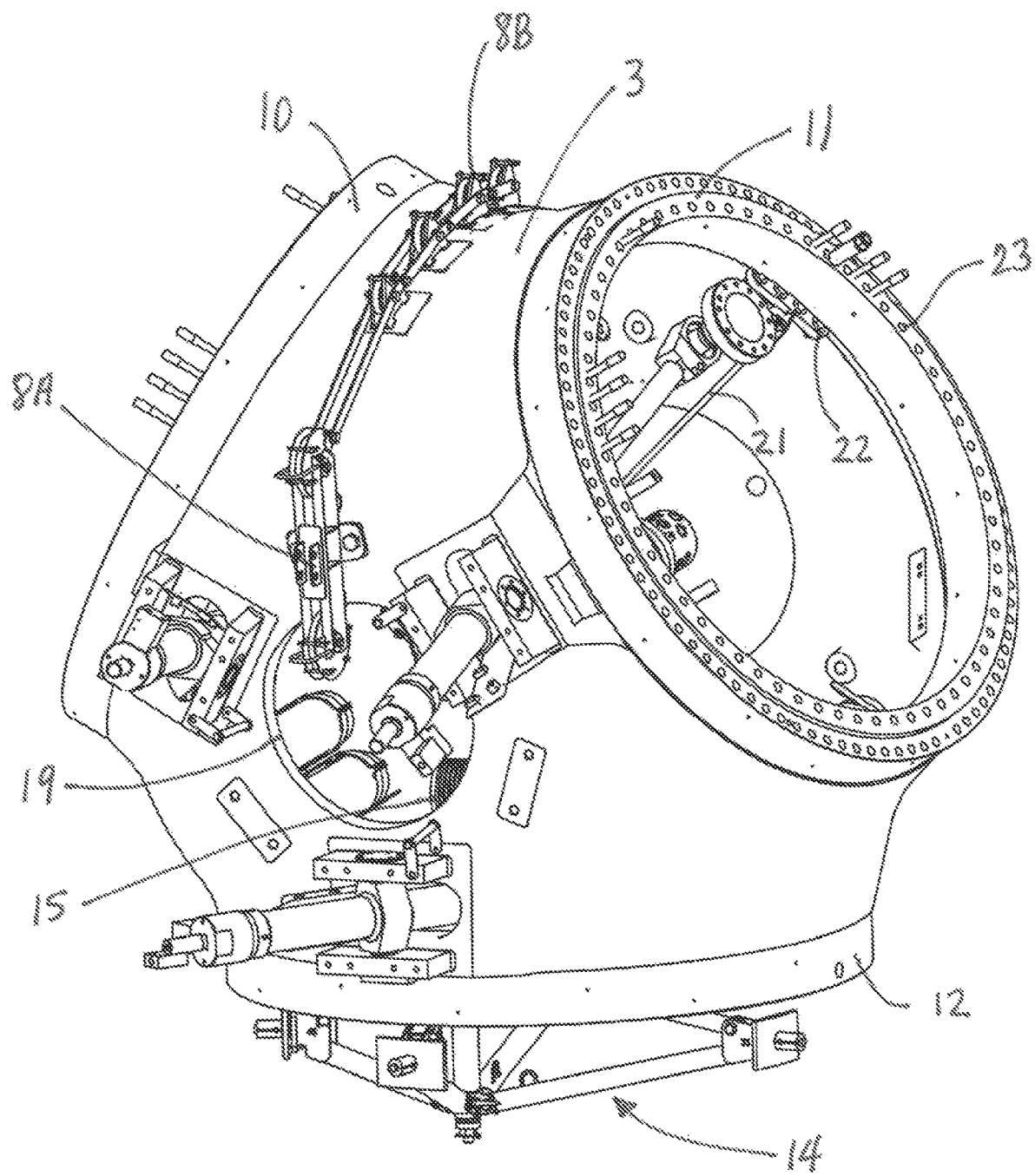
FIG. 7 illustrates a supplemental view of the hub, cable rollers, and blade holding bracket.
Figure 8:
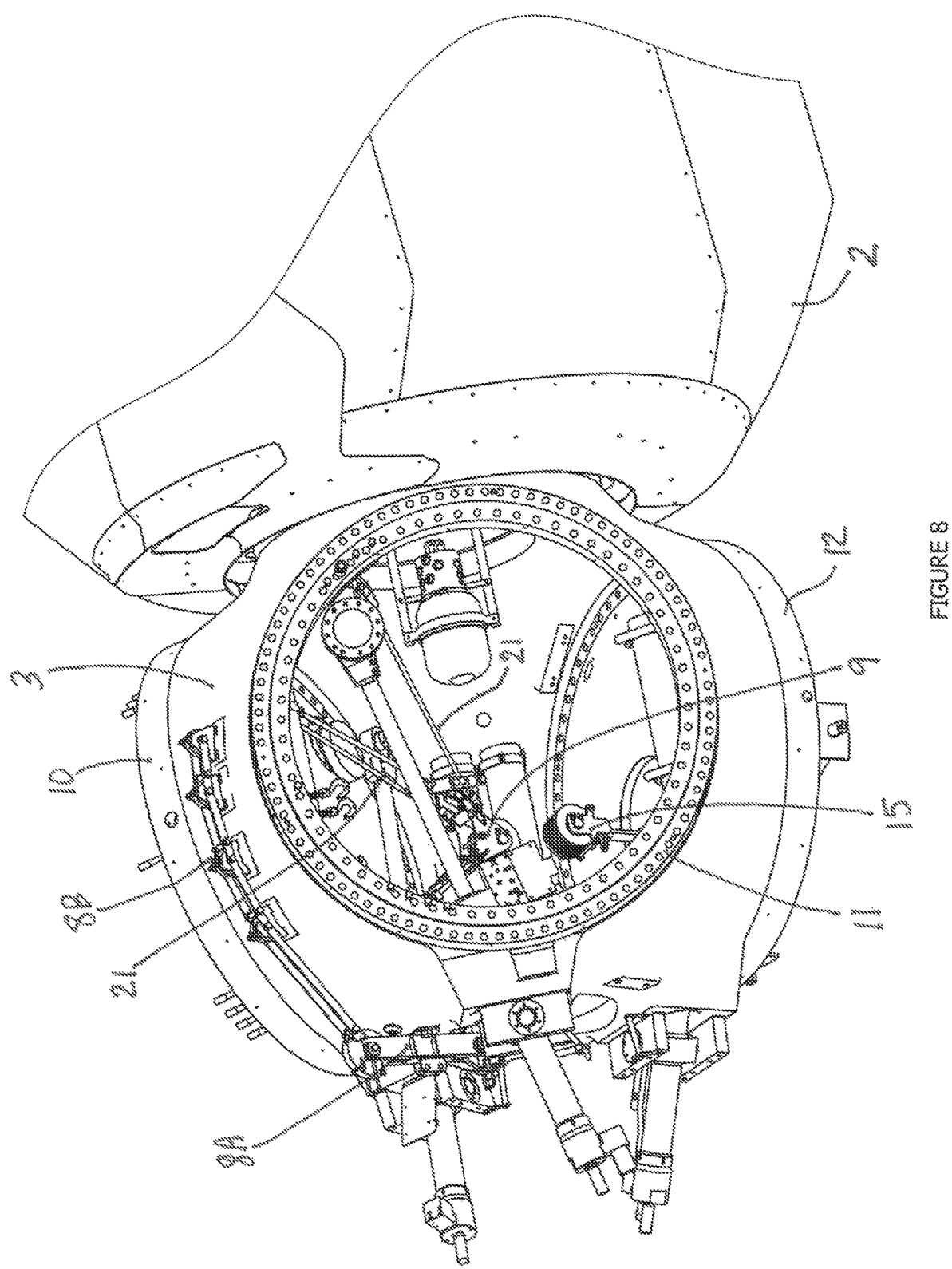
FIG. 8 illustrates an additional perspective view of the hub and nacelle with cable rollers, upper pulley block, and blade holding bracket.

As shown in more detail in FIGS. 3 and 4D, and also in FIGS. 7 and 8, the second set of cable guides 8 includes a further plurality of cable rollers, wherein one of the cable rollers 8A is positioned above a front hub port 19. In this specific embodiment, several intermediate cable rollers 8B are positioned on the external surface of the hub 3 so that the lifting cable 16 can be routed to the cable rollers 8A of FIG. 4D. These intermediate cable rollers 8B do not require mounting by bolting, because they are retained firmly in place once a load is applied to the lifting cable 16. Preferably, rubber mats or sheets are placed below the intermediate cable rollers 8B to prevent shifting during installation until a load is applied, and to account for any hub surface inconsistencies. The lifting cable 16 is only depicted in FIGS. 2 and 3, but omitted in the remaining figures for clarity in showing the detail for the cable rollers 7A-7C, 8A-8B.

Figure 5:
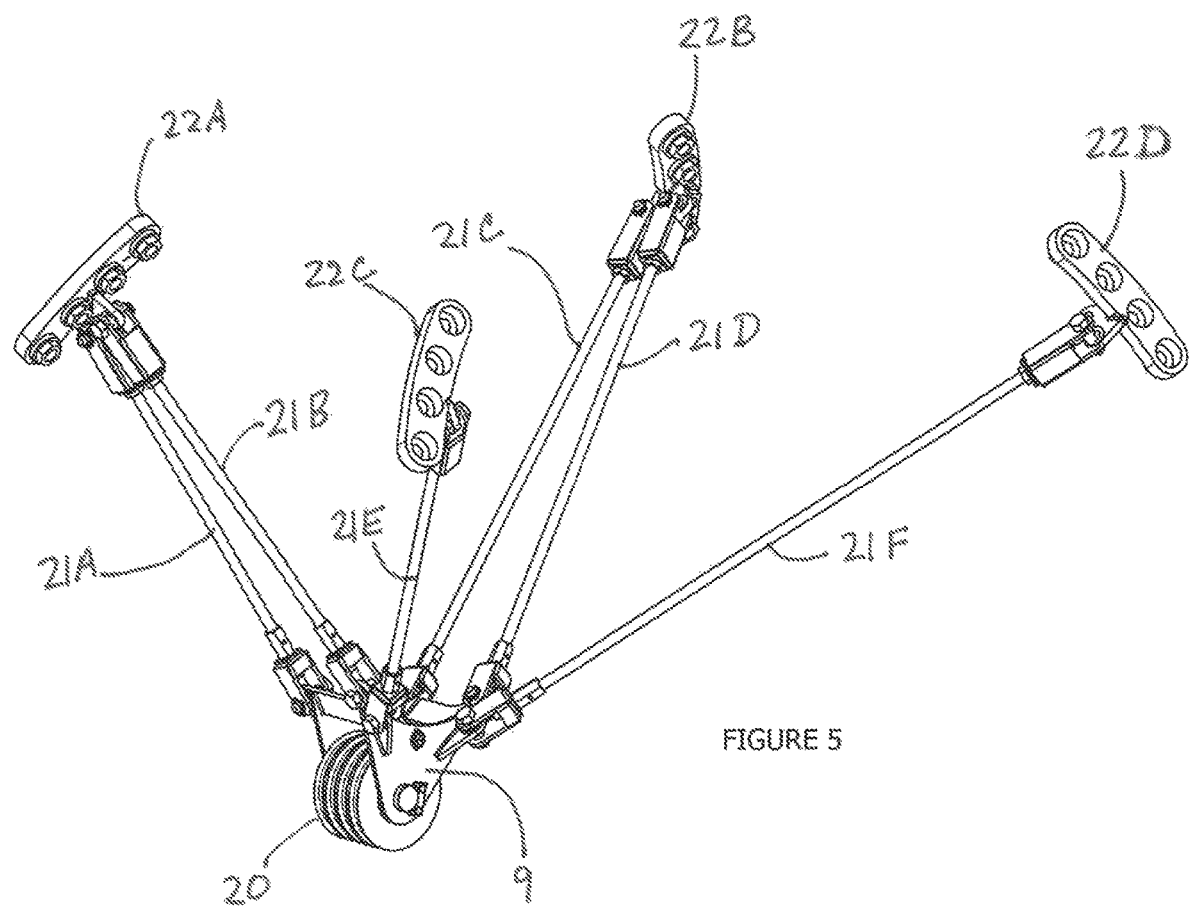
FIG. 5 illustrates a detailed view of the suspended upper pulley block within the hub.
Figure 6A:
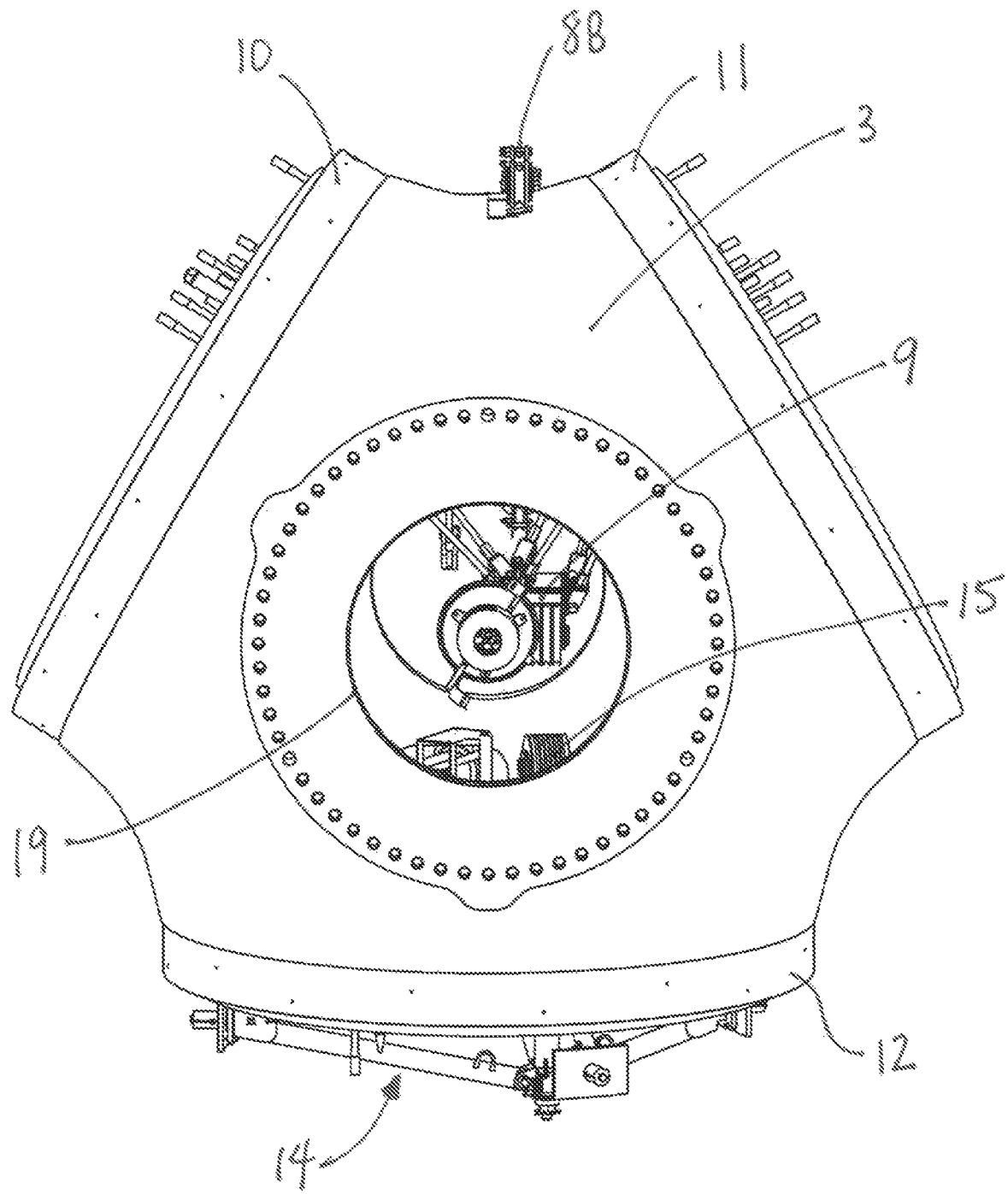
FIG. 6A illustrates a front view of the hub.
Figure 6B:
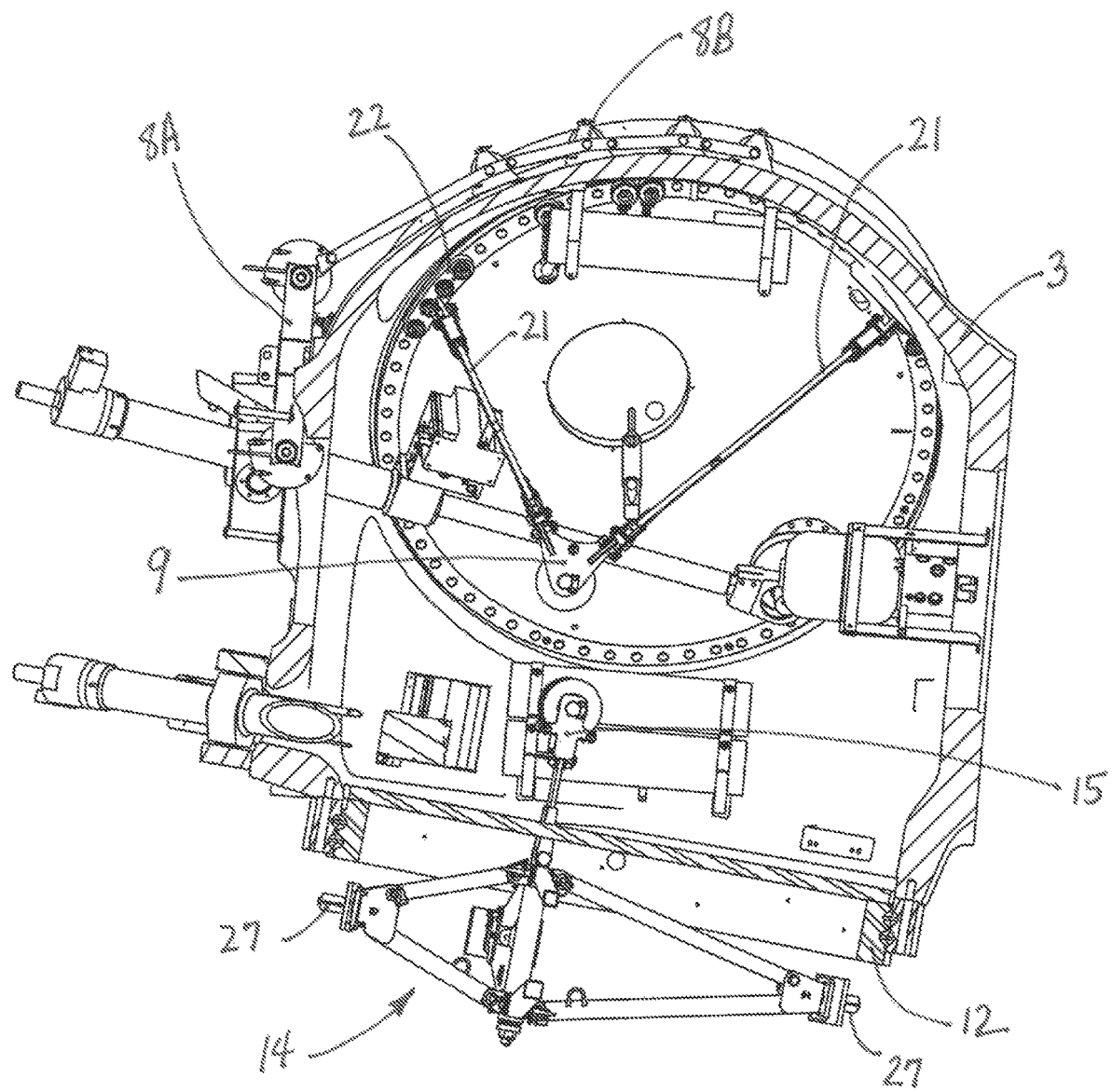
FIG. 6B illustrates a sectional view of the hub and the blade holding bracket positioned below a bottom hub flange.
Figure 6C:
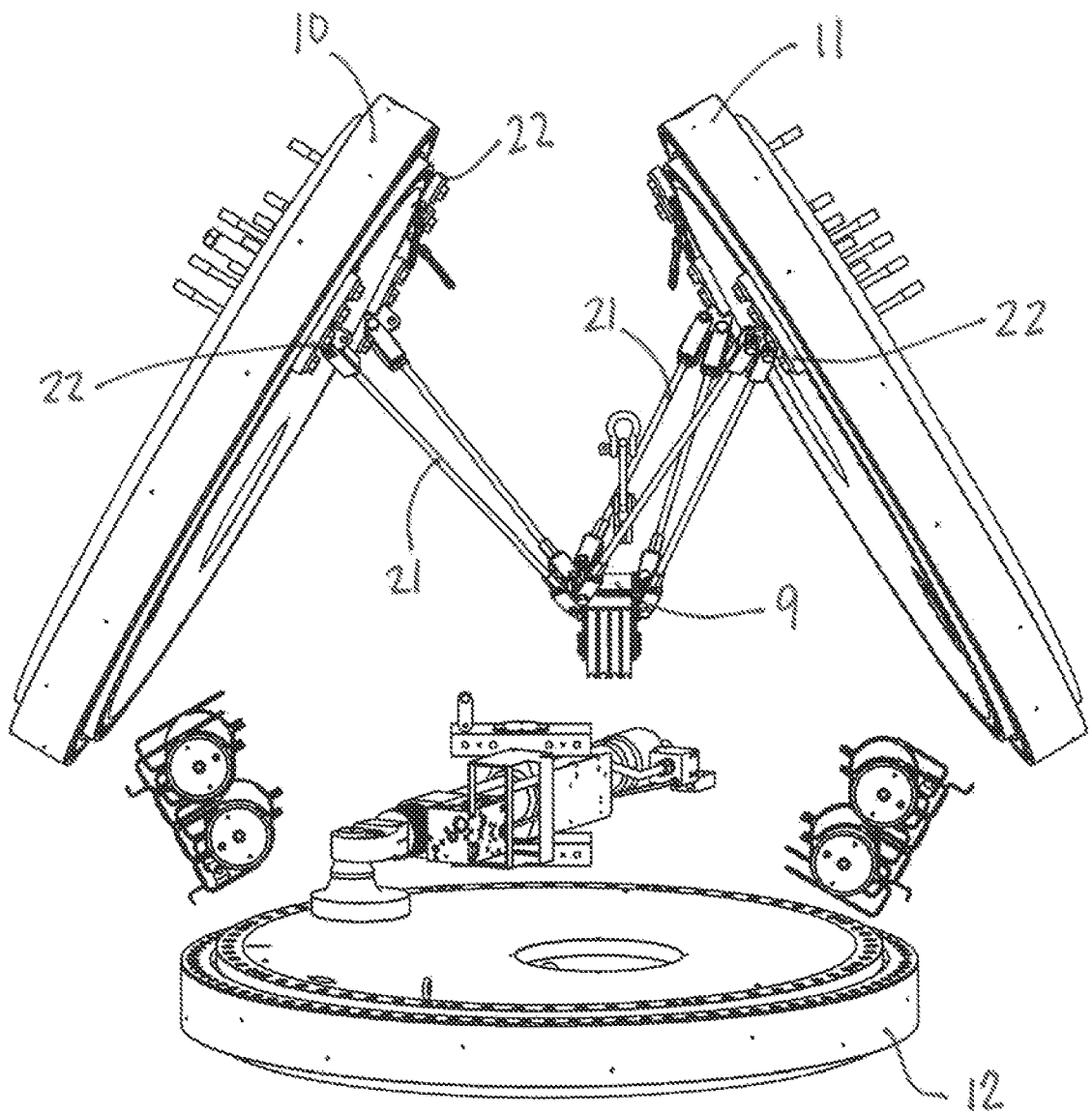
FIG. 6C illustrates a partial view of the hub to show the position of the upper pulley block when attached to the hub flanges.

In a more preferred embodiment, and with reference to FIG. 5, the upper pulley block 9 comprises four (4) sheaves 20 and is attached to and suspended from the first hub flange 10 and the second hub flange 11 by a plurality of turnbuckles 21. This arrangement allows up to eight parts of line to be reeved into the lower pulley block 15 on the blade holding bracket 14. Each turnbuckle 21 is attached on one end to the block 15, while the opposite end of each turnbuckle 21 is attached to a mounting member 22 which includes a number of holes matable with the hub flanges 10, 11 as described below. As can be seen in this embodiment, two turnbuckles 21A-21B are attached to one mounting member 22A, while another two turnbuckles 21C-21D are attached to yet another mounting member 22B, and the remaining two single turnbuckles 21E-21F are attached to their own mounting members 22C, 22D, respectively. As will be appreciated, the particular configuration for any specific situation may vary based on any number of engineering decisions and structural conditions unique to the hub design encountered in the field. The upper points of attachment for the turnbuckles 21 are the existing holes 23 in the hub flanges 10, 11 for bolting of the blade 5 to the hub flanges 10, 11. Each of the turnbuckles 21 is adjustable to establish a predetermined position of the upper pulley block 9 relative to the third hub flange 12, meaning that the upper pulley block 9 must be aligned with the lower pulley block 15. To assist in accurate assembly of the upper pulley block 9 within the hub 3, each of the turnbuckles 21 includes identifying indicia, such as color-coded and/or numbered parts, corresponding to a specific attachment location on both the hub flanges 10, 11 and the upper pulley block 9.

As shown in FIG. 2, the blade 5 has a blade flange 24 defining a blade flange plane 25, and wherein the lower pulley block 15 resides adjacent to the blade flange plane 25, such that the blade 5 can be manipulated in a variety of positions between vertical and horizontal without concern for the lifting cable 16 interfering with or contacting the blade itself. As shown in FIG. 9, the blade holding bracket 14 includes a plurality of positioning members 26A-26D matable with the blade 5, wherein each positioning member 26A-26D includes identifying indicia, such as color-coded and/or numbered parts, corresponding to a specific attachment location on the inside surface of the blade 5. Prior to use within the blade 5, the blade holding bracket 14 is unassembled and carried as a package of parts to the nacelle 2 where it is assembled by a worker. From a review of FIG. 9, it can be appreciated that the blade holding bracket 14 is easily assembled using pins and lock rings. In a typical installation, the blade holding bracket 14 is mounted to the inside of the blade 5 as depicted in FIG. 10, in which the locating pins 27 of the positioning members 26A-26D are inserted into corresponding holes 28 in the blade flange 24. Preferably, the lower pulley block 15 pivots at point 30 relative to a central member 29 of the blade holding bracket 14, wherein the central member 29 includes an axis 32 substantially in alignment with the center of gravity of the blade 5 when the blade is suspended. The lower pulley block 15 also swivels at swivel point 31, providing the lower pulley block 15 with two degrees of freedom relative to the central member 29. This arrangement allows the blade 5 to be maneuvered from vertical to horizontal positions without the lifting cable 16 interfering with the blade 5.

When a blade 5 must be removed from the hub 3, the blade holding bracket 14 would typically be assembled and installed into the blade root while the blade 5 is approximately horizontal, although any range of blade orientation within a two o'clock position to a four o'clock position (or eight o'clock to ten o'clock) would be suitable. This is safer approach than trying to install the blade holding bracket 14 while the blade 5 is in the six o'clock position, because of the risk of a worker falling into the interior of the blade 5. However, the lower pulley block 15 is typically not installed until the blade 5 is rotated into the 6 o'clock position.

Method of Raising and Lowering the Blade

Now that the essential mechanical components of the apparatus are understood in context, the method for installing the blade is described. Generally, the present invention includes a method for installing a blade 5 for a wind turbine 1, the method comprising providing a first set of cable guides 7 mounted within the nacelle 2; providing a second set of cable guides 8 positioned on an exterior surface of the rotor hub 3; providing an upper pulley block 9 suspended from a first hub flange 10 and a second hub flange 11, wherein the upper pulley block 9 is positioned above a third hub flange 12 oriented in a downward direction; providing a winch 6 positioned at a ground level; placing a blade holding bracket 14 within a blade 5, wherein the blade holding bracket 14 includes a lower pulley block 15, and wherein the lower pulley block 15 pivots and swivels relative to the blade holding bracket 14; routing a lifting cable 16 from the winch 6, over the first and second set of cable guides 7, 8, and reeved through the upper pulley block 9 and the lower pulley block 15, such that the lower pulley block 15 can be raised and lowered relative to the upper pulley block 9; raising the blade 5; and attaching the blade 5 to the third hub flange 12.

In a preferred embodiment, the upper pulley block 9 is attached to and suspended from the first hub flange 10 and the second hub flange 11 by a plurality of turnbuckles 21, and the method further includes the step of adjusting one or more of the turnbuckles 21 to establish a predetermined position of the upper pulley block 9 relative to the third hub flange 12.

Further preferably, the upper pulley block 9 is attached to and suspended from the first hub flange 10 and the second hub flange 11 by a plurality of turnbuckles 21, wherein each of the turnbuckles 21 includes identifying indicia corresponding to an attachment location, and the method further includes the step of installing the turnbuckles 21 to the attachment locations corresponding to the identifying indicia.

In another embodiment, the method may include the step of providing a crane 30 to support a tail of the blade 5 when the blade 5 is being lowered to the ground level, and using the crane 30 to maneuver the tail as the blade 5 is lowered to a horizontal position.

In a similar embodiment, the method may include the step of providing a crane 30 to support a tail of the blade 5 when the blade 5 is being raised from the ground level, and using the crane 30 to maneuver the tail as the blade 5 is raised to an installation position.

Further, and as shown best in FIGS. 12A-12C, the method may include the step of providing various tag lines 32 from the ground level to predetermined locations on the blade 5 to manipulate the blade 5 for removal or installation.

Finally, the invention further includes, in a preferred embodiment, a kit of parts for removing and installing a blade 5 for a wind turbine 1, wherein the wind turbine 1 has a rotor hub 3 with a plurality of hub flanges 10-12 and a nacelle 2 mounted on a tower 5, comprising: a first set of cable guides 7 mountable within the nacelle 2, a second set of cable guides 8 mountable on an exterior surface of the rotor hub 3; an upper pulley block 9; a plurality of adjustable turnbuckles 21; an unassembled blade holding bracket 14 adapted for matable engagement with a blade 5; and a lower pulley block 15, wherein the lower pulley block 15 pivots and swivels relative to the assembled blade holding bracket 14.

In the kit, the blade holding bracket 14 would be unassembled, and the collection of parts described above can be packaged and secured in a compact form for hand carrying by one or more workers via the tower elevator, rather than having to use the nacelle hoist. Such a kit is advantageous over prior methods, because all of the parts are relatively lightweight, less bulky, and portable, which makes repair work simpler and less time-consuming. Once the kit is within the nacelle 2 and installed as described earlier herein, the lifting cable 16 is installed as described below.

Lift Cable Installation

In one example embodiment, the lift cable 16 is commonly a 15 mm wire cable and may be installed through the cable roller and pulley system by implementing the following steps. The sheave safety bolts or pins from all of the cable rollers 7, 8 are removed to allow room for the lift cable 16 to lay on the sheaves.

The cable 16 is lifted through the rear nacelle port 17 with the a hoist already within the nacelle 2 with two ropes using stopper hitches, ensuring that the excess hangs freely and that the weight of the tail does not kink the cable at the cable grip. The tail is doubled over on itself so that the end of the lift cable 16 is at the top of the connection and can immediately be placed over the first cable roller 7A once it reaches the nacelle 2.

It is important to ensure that the winch 6 is paying out cable and that a tag line is attached to the nacelle hoist hook to control sway. Also, there should always be slack in the cable when pulling it up with the hoist, otherwise the nacelle hoist may be overloaded.

The lift cable 16 is laid over the sheave on the first cable roller 7A, and the end is pulled through the nacelle 2 with the weight of the lift cable 16 supported by the nacelle hoist. The safety bolts on the first cable roller 7A are then replaced to secure the lift cable 16 on the sheave. The slack tail of the cable 16 is then similarly installed over the other cable rollers 7B-7C in the nacelle 2, and the safety bolts replaced to secure the cable.

The lift cable 16 is then fed out of the front nacelle port 18 and over the hub 3. The cable is laid on each sheave of the hub rollers 8A-8B, and the safety bolts are replaced.

Reeve the cable coming from the bottom of the last cable roller 8A through the suspended upper pulley block 9 and the lower pulley block 15 attached to the blade holding bracket 14. Reeve six (6) or eight (8) parts of line depending on the weight of the blade 5 being raised or lowered. Terminate the cable at a load cell mounted on the dead in connection.

Lower the nacelle hoist until the weight of the hanging cable is held by the cable rollers 7A-7C, 8A-8B, and lower the cable down with the chain hoist until taught. Apply a tension to the cable (typically about 14,000 lbs) with the main ground winch 6, and check for any cable interferences. Each of the cable rollers have some amount of deflection when loaded. If the cable 16 is close to an obstruction without load, it is important to verify that the cable 16 will not be getting closer as a load is introduced to the system.

The tag lines 32 may be installed according to one example embodiment set forth below. Eight tag lines 32 may be connected to the blade 5. Five of the eight tag lines 32 are connected to the root of the blade 5. Four (two each side) control the pitch of the blade 5 during lowering. The fifth tag line 32 at the root comes down to the ground on the front side of the turbine 1. The remaining three tag lines 32 are connected at the blade bag closer to the tip of the blade 5. One tag line 32 goes out each side, then the final tag line 32 comes out the front of the turbine 1. This final tag line from the tip to the front is critical for pulling with enough force to counter the angle of the blade 5 when installed. Once the tag lines 32 have been installed, the blade 5 may be lowered.

The description and illustrations are by way of example only. While the description above makes reference to various embodiments, it should be understood that many changes and modifications can be made without departing from the scope of the disclosure. Many more embodiments and implementations are possible within the scope of this invention and will be apparent to those of ordinary skill in the art. The invention is not limited to the specific details, representative embodiments, and illustrated examples in this description.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. In a wind turbine having a rotor hub with a plurality of hub flanges and a nacelle mounted on a tower, a method for installing a blade for the wind turbine, the method comprising:
    providing a first set of cable guides mounted within the nacelle;
    providing a second set of cable guides positioned on an exterior surface of the rotor hub, wherein the second set of cable guides prevent contact between a lifting cable and the rotor hub;
    providing an upper pulley block suspended from a first hub flange and a second hub flange, wherein the upper pulley block is positioned above a third hub flange oriented in a downward direction;
    providing a winch positioned at a ground level;
    mounting a blade holding bracket to a circumferentially interior surface of an interior wall of said blade, wherein the blade holding bracket includes a lower pulley block positioned within or above a plane of an opening of a root end of said blade, and wherein the lower pulley block pivots and swivels relative to the blade holding bracket;
    routing the lifting cable from the winch, over the first and second set of cable guides, and reeved through the upper pulley block and the lower pulley block, such that the lower pulley block can be raised and lowered relative to the upper pulley block;
    raising the blade; and
    attaching the blade to the third hub flange;
    wherein the blade is installed independently of a pitch bearing; and
    wherein the blade holding bracket comprises four distinct arm structures spaced apart by at least 30 degrees, whereby a distal end of each such arm structure is mounted to the circumferentially interior surface of said interior wall of said blade.

2. The method of claim 1, wherein the upper pulley block is attached to and suspended from the first hub flange and the second hub flange by a plurality of turnbuckles, further including the step of adjusting one or more of the turnbuckles to establish a predetermined position of the upper pulley block relative to the third hub flange.

3. The method of claim 1, wherein the upper pulley block is attached to and suspended from the first hub flange and the second hub flange by a plurality of turnbuckles, wherein each of the turnbuckles includes identifying indicia corresponding to an attachment location, and further including the step of installing the turnbuckles to the attachment locations corresponding to the identifying indicia.

4. The method of claim 1, further including the step of providing a crane to support a tail of the blade when the blade is being lowered to the ground level, and using the crane to maneuver the tail as the blade is lowered to a horizontal position.

5. The method of claim 1, further including the step of providing a crane to support a tail of the blade when the blade is being raised from the ground level, and using the crane to maneuver the tail as the blade is raised to an installation position.

6. The method of claim 1, further including the step of providing tag lines from the ground level to predetermined locations on the blade to manipulate the blade for removal or installation.

7. The method of claim 1, wherein said four distinct arm structures are spaced apart by 90 degrees.

* * * * *